US006742123B1

(12) United States Patent
Foote (10) Patent No.: US 6,742,123 B1
(45) Date of Patent: May 25, 2004

(54) APPARATUS AND METHODS FOR PREVENTING DENIAL OF SERVICE ATTACKS

(75) Inventor: William F. Foote, Cupertino, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/394,121

(22) Filed: Sep. 10, 1999

(51) Int. Cl.$^7$ .................................................. G06F 9/45
(52) U.S. Cl. ...................... 713/200; 713/164; 713/146; 717/146; 717/131; 717/126; 705/26; 705/16; 705/37; 380/287
(58) Field of Search ................................ 713/200, 164; 717/146, 131, 126; 705/27, 37, 26, 16; 380/287, 260, 27

(56) References Cited

U.S. PATENT DOCUMENTS

| 5,485,409 A | * | 1/1996 | Gupta et al. ................. 713/200 |
| 5,557,747 A | * | 9/1996 | Rogers et al. ............... 709/223 |
| 6,167,535 A | * | 12/2000 | Foote et al. .................... 714/38 |
| 6,560,774 B1 | * | 5/2003 | Gordon et al. .............. 717/146 |

OTHER PUBLICATIONS

William F. Foote and Hideya Kawahara "Apparatus and Methods for Managing Resources for Resource Constrained Devices", U.S. patent application No. 10/045,514, Filed Oct. 26, 2001, 35 pages.
Hideya Kawahara, William F. Foote, and Dean R.E. Long, "Clean Thread Termination", U.S. patent application No. 09/846,064, Filed Apr. 30, 2001, 25 pages.
Foote, Bill "Description of JavaOS and PersonalJava", Jul. 15, 2002, Release date of PersonalJava 1.0 is Dec. 1997.
Binder, Walter *"Design and Implementation of the J–SEAL2 Mobile Agent Kernel"*, Application and the Internet, 2001.
Foote, William, *"Real–time Extensions to the Java Platform A Progress Report"*, Electrical and Computer Engineering, 1999.
Chan, Patrick, et al. The Java Class Library, Second Edition, vol. 1 (pp. 1723–1750) "1998".
Czajkowski, Grzegorz, et al., "JRes: A Resource Accounting Interface for Java," In Proceedings of the 1998 ACM OOP-SLA Conference, Vancouver, BC, Oct. 1998.
Philippe Bernadat, Laura Feeney, Dan Lambright, and Franco Travostino, *"Java Sandboxes meet Service Guarantees: Secure Partitioning of CPU and Memory,"* Dec. 14, 1998, 24 pp.
Li Gong, *"SecureJava Class Loading,"* Nov.–Dec. 1998, Mobile Code Security, pp. 56–61.
Chris Hawblitzel, Chi–Chao Chang, Grzegorz Czajkowski, Deyu Hu, and Thorsten von Eicken, *"Implementing Multiple Protection Domains in Java,"* Technical Report 97–1660, Department of Computer Science, Cornell University, 15 pp.
William F. Foote, "Apparatus And Methods For Managing Resource Usage," U.S. patent application 09/394,118, Filed Sep. 10, 1999, 36 Pages.
William F. Foote, et al, "Terminating A Group Of Related Threads By Modifying The Prog Ram Counter Of Selected Stack Frames," U.S. patent application No.: 09/536,253, filed Mar. 27, 2000, 32 Pages.
William F. Foote, et al, "Apparatus And Methods For Communicating Between Resource Domains," U.S. patent application No.: 09/727,103, Filed Nov. 29, 2000, 32 Pages.

* cited by examiner

*Primary Examiner*—Ly V. Hua
(74) *Attorney, Agent, or Firm*—Beyer, Weaver & Thomas, LLP.

(57) ABSTRACT

In one aspect of the invention, the frames of a thread stack that associated with the misbehaving code are popped from the thread stack. Exception handling code is allowed to execute for trusted code by popping the trusted code frame via processing an exception, but exception handling is not allowed to execute for untrusted code. In a second aspect, frames are popped on all thread stacks of all threads that are associated with the misbehaving code. Threads are generally deemed to be associated with the misbehaving code when the threads share a same object or the same resources as the thread that is associated with the misbehaving code.

15 Claims, 7 Drawing Sheets

APPARATUS AND METHODS FOR PREVENTING DENIAL OF SERVICE ATTACKS

CROSS REFERENCE TO RELATED APPLICATIONS

This application is related to concurrently filed U.S. patent application Ser. No. 09/394,118 entitled, "Apparatus and Methods for Managing Resource Usage" by William F. Foote, which has assignment rights in common and is incorporated herein by reference for all purposes.

BACKGROUND OF THE INVENTION

The invention relates generally to software applications and, more particularly, to methods and apparatus for aborting threads in an object-based system.

Within an object-based environment, threads are often used to satisfy requests for services. A thread may be thought of as a "sketch pad" of storage resources, and is essentially a single sequential flow of control within a computer program. In general, a thread, or a "thread of control," is a sequence of central processing unit (CPU) instructions or programming language statements that may be independently executed. Each thread has its own execution stack on which method activations reside. As will be appreciated by those skilled in the art, when a method is activated with respect to a thread, an activation is "pushed" on the execution stack of the thread. When the method is deactivated, the activation is "popped" from the execution stack. Since an activation of one method may activate another method, an execution stack operates in a first-in-last-out manner.

Although threads generally self terminate, one may also wish to forcefully terminate a thread while it is executing. For example, one may wish to terminate a thread whose currently executing code is currently mounting a "denial of service attack." A denial of service attack uses all or most of the local host's resources (e.g., processor and/or memory resources). For example, code associated with a particular thread may initiate an infinite loop, which functions to open an infinite number of windows. In this example, the code continues to open windows until so many resources are consumed that the particular application that is executing the code (or the entire computer system) crashes or freezes up.

A denial of service attack is generally associated with untrusted code that originates from an unknown source. For example, downloaded computer programs may include methods from an unknown programming source. In other words, the downloaded program may include untrusted code that was maliciously or unintentionally designed to mount a denial of service attack.

Thus, when code begins to misbehave (e.g., by using an unreasonable amount of resources), it is desirable to kill the thread that is associated with this misbehaving code. One potential solution that has been contemplated is "thread.destroy", which is currently available as a resource within the Java™ II Standard Development Kit although it has not been implemented. Thread.destroy works by deallocating the stack associated with the misbehaving thread. In- other words, the thread's stack is removed from the scheduler, which schedules threads for execution.

Although this solution may work in some situations, thread.destroy does not clean up the internal data structures that the misbehaving thread may have inconsistently altered. That is, the misbehaving thread may be writing to an internal data structure when it is killed and may only partially fill the internal data structure. For example, the misbehaving thread may initiate a print function by setting a print flag, but not yet write to the print buffer before the misbehaving thread is killed. In this example, a thread.destroy may cause garbage to be printed since the thread was killed before it could write valid print data to the print buffer.

Another solution "thread.stop" is currently available as a resource within the Java™ II Standard Development Kit. Thread.stop throws an exception so that a currently executing method may "catch" the exception and execute any implemented clean up code. Although trusted code is generally designed to perform clean up routines (e.g., within a "finally" block), untrusted code cannot be trusted to perform such clean up processes. In other words, the untrusted code's may continue to misbehave when an exception is thrown. For example, when an exception is thrown, an untrusted code's "finally" routine may also mount a denial of service attack. Additionally, thread.stop does not provide any mechanisms for cleaning up any inconsistent data structures.

Therefore, improved methods and apparatus for killing threads associated with code that is misbehaving are desired. Additionally, there is a desire to cleanly kill these threads such that data structures are left in a consistent state.

SUMMARY OF THE INVENTION

Broadly speaking, the present invention fills these needs by providing apparatus and methods for aborting threads. In one aspect of the invention, the frames of a thread stack that are associated with the misbehaving code are popped from the thread stack. Exception handling code is allowed to execute for trusted code by popping the trusted code frame via processing an exception, but exception handling is not allowed to execute for untrusted code. In a second aspect, frames are popped on all thread stacks of all threads that are associated with the misbehaving code. Threads are generally deemed to be associated with the misbehaving code when the threads share a same object or the same resources as the thread that is associated with the misbehaving code.

In one embodiment, the invention pertains to a method for aborting a thread that has an associated thread stack with a plurality of frames that are associated with either trusted or untrusted code. A frame within the thread stack of the thread to be aborted is selected. The selected frame from the thread stack of the thread to be aborted is popped when the selected frame is associated with untrusted code. An exception is thrown for the selected frame from the thread stack of the thread to be aborted when the selected frame is associated with trusted code.

In a preferred embodiment, the above described method is repeated for each frame within the thread stack such that the associated thread is aborted. In one aspect, the trusted code is unlikely to result in a denial of service attack and it is unknown whether untrusted code will mount a denial of service attack. In another aspect, the untrusted code has an unknown resource utilization amount. In yet another aspect, the untrusted code was downloaded from an untrusted source. In a final embodiment, processing an exception for the selected frame allows the selected frame to complete any clean up routines.

In yet another embodiment, the invention pertains to a computer readable medium containing instructions for aborting a thread that has an associated thread stack with a plurality of frames that are associated with either trusted or untrusted code. The computer readable medium includes (a) computer code for selecting a frame within the thread stack of the thread to be aborted, (b) computer code for popping the selected frame from the thread stack of the thread to be aborted when the selected frame is associated with untrusted code, and (c) computer code for processing an exception for the selected frame from the thread stack of the thread to be aborted when the selected frame is associated with trusted code.

In another aspect, the invention pertains to a computer system for aborting a thread that has an associated thread stack with a plurality of frames that are associated with either trusted or untrusted code. The computer system includes an identifier configured to select a frame within the thread stack of the thread to be aborted and a frame handler configured to pop the selected frame from the thread stack of the thread to be aborted when the selected frame is associated with untrusted code and to process an exception for the selected frame from the thread stack of the thread to be aborted when the selected frame is associated with trusted code.

In an alternative embodiment, a method for aborting one or more threads is disclosed. Each thread executes one or more code sets, wherein at least one of the code sets has been identified as misbehaving and is associated with an abort identifier. At least one of the code sets include one or more checkpoints. The abort identifier of the misbehaving code is set to indicate that an abort procedure is to be performed. Currently executing threads that have code sets that are associated with the abort identifier abort are aborted.

In one alternative embodiment, the currently executing threads that are associated with the abort identifier are aborted by processing an exception for the currently executing code set when an abort checkpoint has been reached and the currently executing code set is associated with the abort identifier associated with the misbehaving code set. If there is no abort checkpoint, execution of the code set associated with the currently executed thread is continued.

In another embodiment, currently executing threads that are associated with the abort identifier further are aborted by determining whether there is an abort checkpoint located prior to the exception handling code when the currently executing code set contains exception handling code. The exception handling code is inhibited from executing when the currently executing code set contains exception handling code and if there is an abort checkpoint located prior to the exception handling code. In a preferred embodiment, the exception handling code is inhibited only if the exception handling code is associated with the abort identifier associated with the misbehaving code set.

In another aspect, the invention pertains to a computer readable medium containing instructions for aborting one or more threads. Each thread executes one or more code sets. At least one of the code sets has been identified as misbehaving and is associated with an abort identifier, and at least one of the code sets have one or more checkpoint inserted within the code set. The computer readable medium includes computer code for setting the abort identifier of the misbehaving code to indicate that an abort procedure is to be performed and computer code for aborting currently executing threads that have code sets that are associated with the abort identifier.

In another embodiment, the invention pertains to a computer system configured to abort one or more threads. Each thread executes one or more code sets, and at least one of the code sets has been identified as misbehaving and is associated with an abort identifier. At least one of the code sets have one or more checkpoint inserted within the code set. The computer system includes an abort indicator arranged to set the abort identifier of the misbehaving code to indicate that an abort procedure is to be performed and a thread executioner arranged to abort currently executing threads that have code sets that are associated with the abort identifier.

The described embodiments of the present invention have several associated advantages. For example, when a method frame is popped that is associated with misbehaving code, exception handling is inhibited if the popped frame is associated with untrusted code. Thus, untrusted code is inhibited from continuing to misbehave through its exception handling code. In contrast, trusted code is allowed to perform exception handling (e.g., clean up routines) prior to aborting the associated thread. Thus, the likelihood of internal data structures being left in an inconsistent state is minimized. Additionally, in one embodiment, all of the threads that share a same resource are aborted. Thus, if the shared resource is left in an inconsistent state by an aborted thread, other threads that are associated with the inconsistent shared resource are prohibited from accessing the inconsistent resource when they too are aborted.

These and other advantages of the present invention will become apparent upon reading the following detailed descriptions and studying the various figures of the drawings.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE EMBODIMENTS

Reference will now be made in detail to specific embodiments of the invention. While the invention will be described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In general, the invention pertains to methods and apparatus for aborting threads. In one aspect of the invention, the frames of a thread stack that are associated with the misbehaving code are popped from the thread stack. Popping the frames of a thread stack aborts the associated misbehaving thread. Processes for popping a misbehaving thread stack's frames are described below in reference to FIGS. 1A and 1B. In a second aspect, frames are popped on all thread stacks of all threads that are associated with the misbehaving code. Threads are generally deemed to be associated with the misbehaving code when the threads share a same object or the same resources as the thread that is associated with the misbehaving code.

Figure 1A:
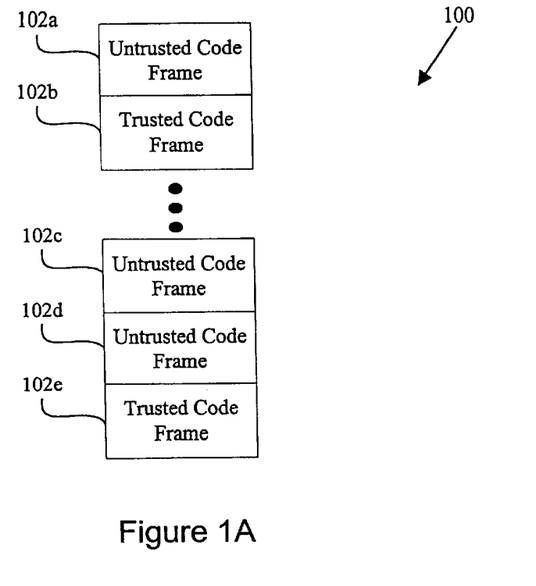
FIG. 1A is a diagrammatic representation of a thread stack in accordance with one embodiment of the present invention.

First, a mechanism for aborting a single thread will be described with reference to FIGS. 1A and 1B. FIG. 1A is a diagrammatic representation of a thread stack 100. Each executing thread typically corresponds to a single thread stack. Each thread stack includes a plurality of stack frames 102. Each stack frame 102 of a particular thread stack corresponds to an individual method of the individual thread that is associated with the particular thread stack. A thread frame typically includes an operations stack (not shown) for storing a plurality of parameters that are used by the associated method. For example, these parameters may include constant and/or variable values.

Additionally, as a method is activated, a corresponding frame is added to the top of the associated thread stack. As other methods of the same thread are activated (e.g., spawned by the previous method), they are also added to the top of the thread stack above the previous stack frame. Thus, activated methods are layered on top of each other within the thread stack. When the last method to be activated is finished or deactivated, its corresponding stack frame is popped from the top of the frame. The previously activated method may then complete its execution. This method is then deactivated and popped from the thread stack.

For simplicity, each stack frame 102 may be defined as either a trusted code frame (e.g., 102e) or an untrusted code frame (e.g., 102d). Trusted code generally includes any code that originates from a known source or was designed by a known programmer. In other words, the trusted code's design source is known and/or the trusted code has been thoroughly tested before being implemented on the local client. Trusted code is unlikely to result in a denial of service attack. For instance, trusted code may include any system methods that are shipped with the virtual machine.

Untrusted code, on the other hand, generally includes any code that has an unknown source and/or designer. Since one cannot easily ascertain how the untrusted code is written or functions, the untrusted code's resource utilization is also unknown. Over subscription of local resources by the untrusted code may result in a denial of service attack. For example, any code that is downloaded onto a local host from a remote site that is not affiliated with the local host is typically untrusted code. Specifically, when a web page is accessed, applet code associated with an accessed page that is downloaded to the local host will usually fall into the untrusted category. If the downloaded code originates from an unreliable source, such as a hacker or incompetent programmer, the code is untrusted code. That is, the untrusted code may have been specifically or unintentionally designed to mount a denial of service attack against a local host or particular application program.

In general terms, the present invention provides mechanisms for aborting a thread so that untrusted methods are simply popped from the thread stack. Trusted methods are also popped from the stack by throwing an exception during execution of such a trusted method. In contrast to what happens after an untrusted code frame is popped, after the trusted method is popped, exception handling methods that are associated with the popped method are then allowed to execute. For example, an exception handling method finishes writing to internal data structures so that they are not left in inconsistent states. Exception code that is associated with untrusted code, on the other hand, is not allowed to execute since the exception code cannot be trusted to not cause further damage (e.g., by spawning other misbehaving threads). Thus, an exception is not thrown during execution of untrusted code.

Figure 1B:
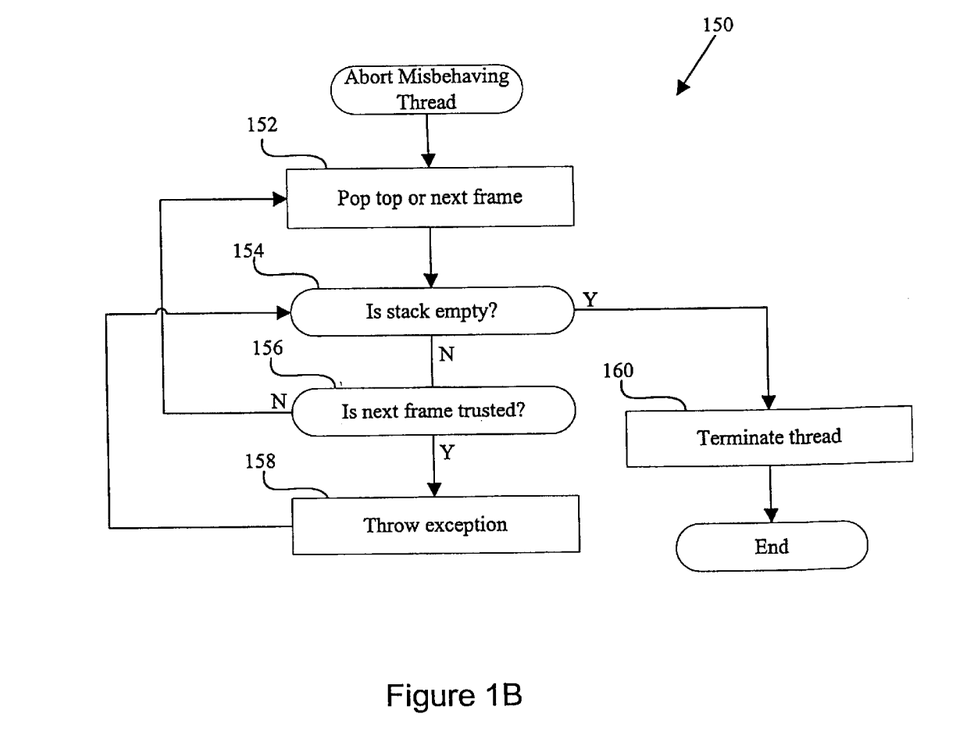
FIG. 1B is a flowchart illustrating a process of aborting a misbehaving thread in accordance with a first embodiment of the present invention.

FIG. 1B is a flowchart illustrating a process 150 of aborting a misbehaving thread in accordance with a first embodiment of the present invention. Initially, the op frame is popped in operation 152. The first frame is popped since it is associated with the currently misbehaving code. Thus, the untrusted code frame 102a of FIG. 1A is popped from the top of the thread stack. Of course, the bottom frame of the thread stack may be popped, depending on how the thread stack is configured. The frame may be popped by any suitable mechanism. For example, the local operating system and virtual machine typically provide this function.

It is then determined whether the stack is empty in operation 154. In other words, it is determined whether the thread has been completely aborted by unwinding its entire thread stack (e.g., by popping each method frame). If the stack is not empty, it is then determined whether the next frame is trusted in operation 156. In the example of FIG. 1A, the next frame is trusted code frame 102b. In this illustration, an exception is then thrown in operation 158. As described above, throwing an exception will likely result in the trusted method's exception handling code "catching" the exception and performing any necessary clean up routine so that data structures are not left in inconsistent states. After the exception handling code or clean up code of the trusted code is executed, the trusted code frame is also popped. It is then determined again whether the stack is empty in operation 154. If the stack is not empty, it is then determined again whether the next frame is trusted in operation 156.

If the frame is not trusted, the next frame is simply popped in operation 152. Untrusted frames are simply popped, whereas trusted code frames are thrown an exception. Popping the frame (either directly or indirectly by throwing an exception) results in a release of any locked objects that are associated with the popped code frame. After all of the code frames are popped, the thread terminates in operation 160.

Although the mechanism of FIG. 1B for killing a misbehaving thread works well in certain cases (e.g., where there is only a single misbehaving thread that does not leave any shared objects in an inconsistent state), this mechanism may not kill all associated threads that work together to misbehave. For example, an applet may be associated with multiple threads that are each designed to mount a denial of service attack. When a single misbehaving thread is aborted, other associated threads may fill in for the aborted thread and mount another denial of service attack. Additionally, several threads may share the same resource (e.g., the same object).

Thus, killing a single thread may leave a shared object in an inconsistent state for the other threads that use that same object. Thus, it may be desirable to abort all threads that use the same resource or object as the misbehaving thread.

Figure 2:
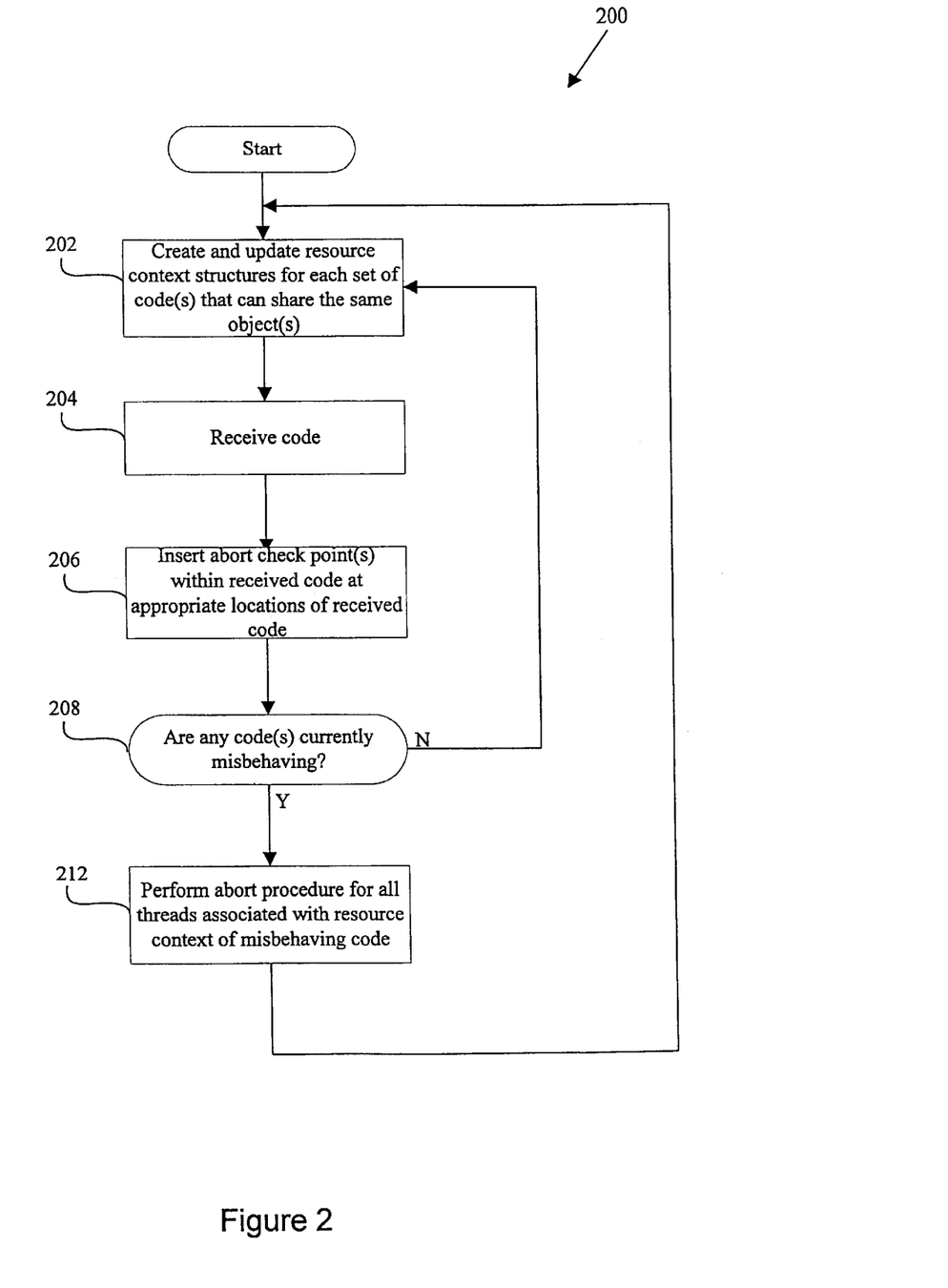
FIG. 2 is a flowchart illustrating a process for aborting associated threads in accordance with a second embodiment of the present invention.

FIG. 2 is a flowchart illustrating a process 200 for aborting associated threads in accordance with a second embodiment of the present invention. A resource context structure is created and updated for each set of codes that can share the same objects in operation 202. The resource context structure generally provides a mechanism for referencing the codes from one or more computer programs that can share the same resource or object. Thus, the code of a currently executing thread will be associated with a particular resource context structure. The resource context structure is further described in U.S. patent application Ser. No. 09/394,118 by Foote, filed concurrently herewith, which is incorporated by reference in its entirety for all purposes.

After resource structures are created, code is then received in operation 204. For example, applets that are associated with an accessed world wide web page are downloaded from a remote server to the local client. Abort checkpoints are then inserted within the received code at appropriate locations in operation 206. The abort checkpoints may be inserted by any suitable mechanism. For example, as a class of a particular applet is loaded or instantiated by a Java™ implemented virtual machine, checkpoints may be inserted within the class file.

After the checkpoints are inserted (if any), one or more code sets (e.g., methods) are then executed. When code execution reaches an abort checkpoint, execution of the received code is interrupted to determine whether an abort should be performed on the currently executing code or thread. If an abort is initiated, the remaining code that follows the abort checkpoint is not executed.

Abort checkpoints are inserted at locations within untrusted code that precede any downloaded code that may misbehave. For example, within Java™ based code, abort checkpoints are inserted at the beginning of try blocks, the beginning of finally blocks, the beginning of catch blocks, and the beginning of finalizer blocks. These blocks are described further below with reference to FIG. 5. Checkpoints may be inserted prior to any backward branching code so as to prevent an infinite loop. Additionally, checkpoints may be inserted at regular intervals, e.g., after every 100 to 1000 lines of code.

After abort checkpoints are inserted, it is then determined whether there are any codes that are currently misbehaving in operation 208. If there are any misbehaving codes, an abort procedure is then performed for all threads associated with the resource context of the misbehaving code in operation 212. The associated threads may be aborted in any suitable manner. One mechanism for aborting associated threads is described below with reference FIG. 3. After the abort procedure is performed or if there are no misbehaving codes, the process 200 is repeated.

Figure 3:
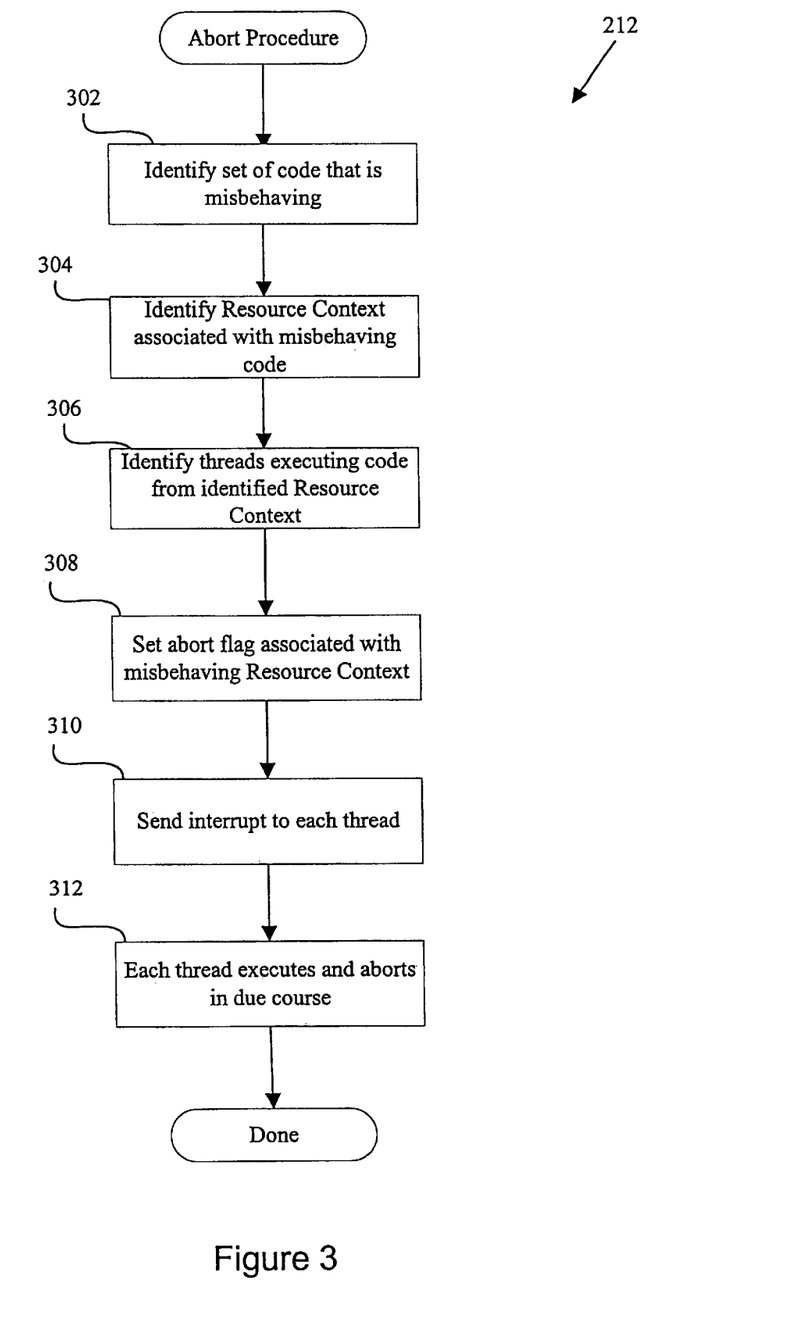
FIG. 3 is a flowchart illustrating the abort procedure of FIG. 2 in accordance with one embodiment of the present invention.

FIG. 3 is a flowchart illustrating the abort procedure 212 of FIG. 2 in accordance with one embodiment of the present invention. The threads associated with misbehaving code (e.g., that share a same resource context) are generally aborted by identifying the associated threads and using an indicator associated with the associated thread's resource context to communicate that an abort should occur for associated threads. The associated threads may include any combination of trusted and untrusted code. Trusted code is allowed to execute and complete, while untrusted code execution is halted when an inserted abort check point is reached. When an abort check point is reached and if the associated resource context indicates an abort must occur, an exception is thrown to pop the currently executing method's frame from the associate thread stack. In other words, the thread stacks of the associated threads are dismantled by allowing trusted frames to pop after normal execution of the trusted method and forcing untrusted frames to pop prior to executing the associated untrusted method.

Initially, as shown in FIG. 3 a set of code is identified that is misbehaving in operation 302. This identification may be performed in any suitable manner. For examples, any executing code that is approaching the limits of a particular resource may be identified as misbehaving. By way of specific example, if a method is opening a significantly large number of windows within a web browser program, the particular web browser may have a maximum window number of 50. In other words, the web browser does not handle more than 50 windows (e.g., it crashes when more than 50 are open). In this case, the associated code of the method may be identified as misbehaving when it opens more than 25 windows.

A resource context is then identified that is associated with the misbehaving code in operation 304. Threads are then identified that are executing code from the identified resource context in operation 306. Mechanisms for associating a resource context with a thread and then identifying which resource context is associated with a thread are described in the above referenced U.S. patent application by William F. Foote. An abortion flag associated with the misbehaving resource context is then set in operation 308.

An interrupt is then sent to each identified thread in operation 310. Sending an interrupt to each thread is optional. However, an interrupt may be desired if a thread is requesting data (e.g., through a socket over a network). When a thread requests I/O data, trusted code may then be executing, and the trusted code may be accessing I/O data at a slow rate (e.g., from a slow remote site). An interrupt will generally function to interrupt all I/O data transfers.

Each thread may then execute and abort in due course in operation 312. The abort procedure 212 then ends. That is, each thread will execute methods until an abort checkpoint that was previously inserted is reached within the executing code. When the abort checkpoint is reached, the executing method or code will abort if it is associated with the same resource context structure as the misbehaving thread. Otherwise, the method or code will continue execution.

Figure 4:
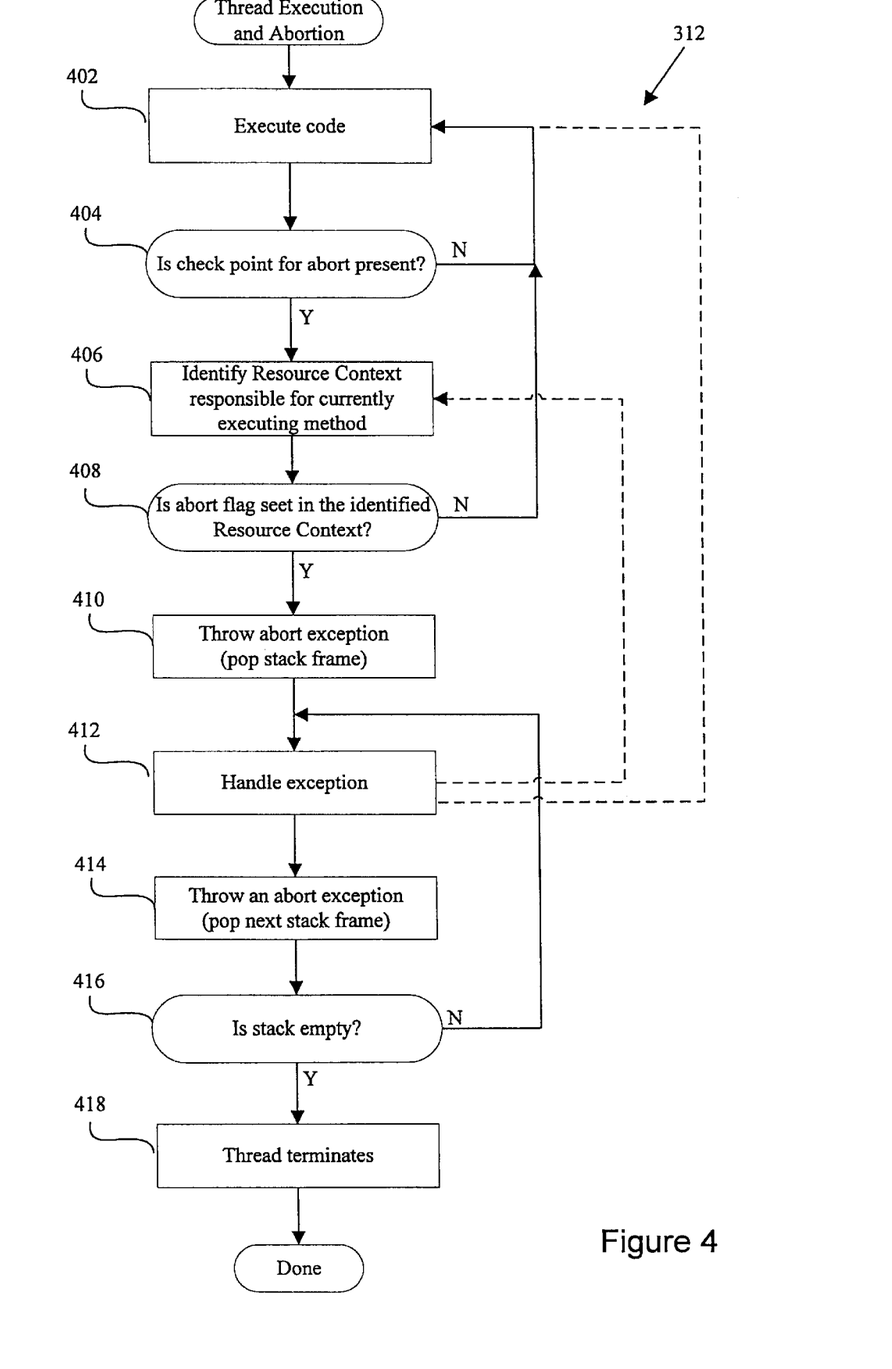
FIG. 4 is a flowchart illustrating thread execution and abortion operation of FIG. 3 in accordance with one embodiment of the present invention.

FIG. 4 is a flowchart illustrating the operation 312 of FIG. 3 of a thread executing and aborting in due course in accordance with one embodiment of the present invention. Initially, code is executed in operation 402. It is then determined whether a checkpoint for an abort is present in operation 404. If a checkpoint is not present, the code continues to execute in operation 402. Of course, operation 404 of determining whether there is an abort checkpoint may occur prior to executing any code in operation 402.

If a checkpoint is present, the resource context that is responsible for the currently executing method or code is then identified in operation 406. Mechanisms for associating a resource context with a thread and then identifying which resource context is associated with a thread are described in the above referenced U.S. patent application by William F. Foote. It is then determined whether the abort flag is set in the identified resource context in operation 408. If the abort flag is not set, the code continues to execute in operation 402.

If the abort flag is set, an abort exception is thrown in operation 410. In other words, the stack frame is popped.

The exception is then handled in operation 412. This exception handling procedure is explained further below in reference to FIG. 5. Generally, trusted code is allowed to execute exception handling code when an exception is thrown, while untrusted code will contain abort checkpoints prior to any exception handling code so that execution of the alleged exception handling code is inhibited.

After handling any exceptions, the next stack frame is then popped in operation 414 by throwing another exception. It is then determined whether the thread stack is empty in operation 416. If the stack is not empty, the exception that was thrown for the next frame in operation 410 is then handled in operation 412. If the stack is empty, the thread terminates in operation 418 since all frames associated with the thread have been popped off the thread's stack.

Figure 5:
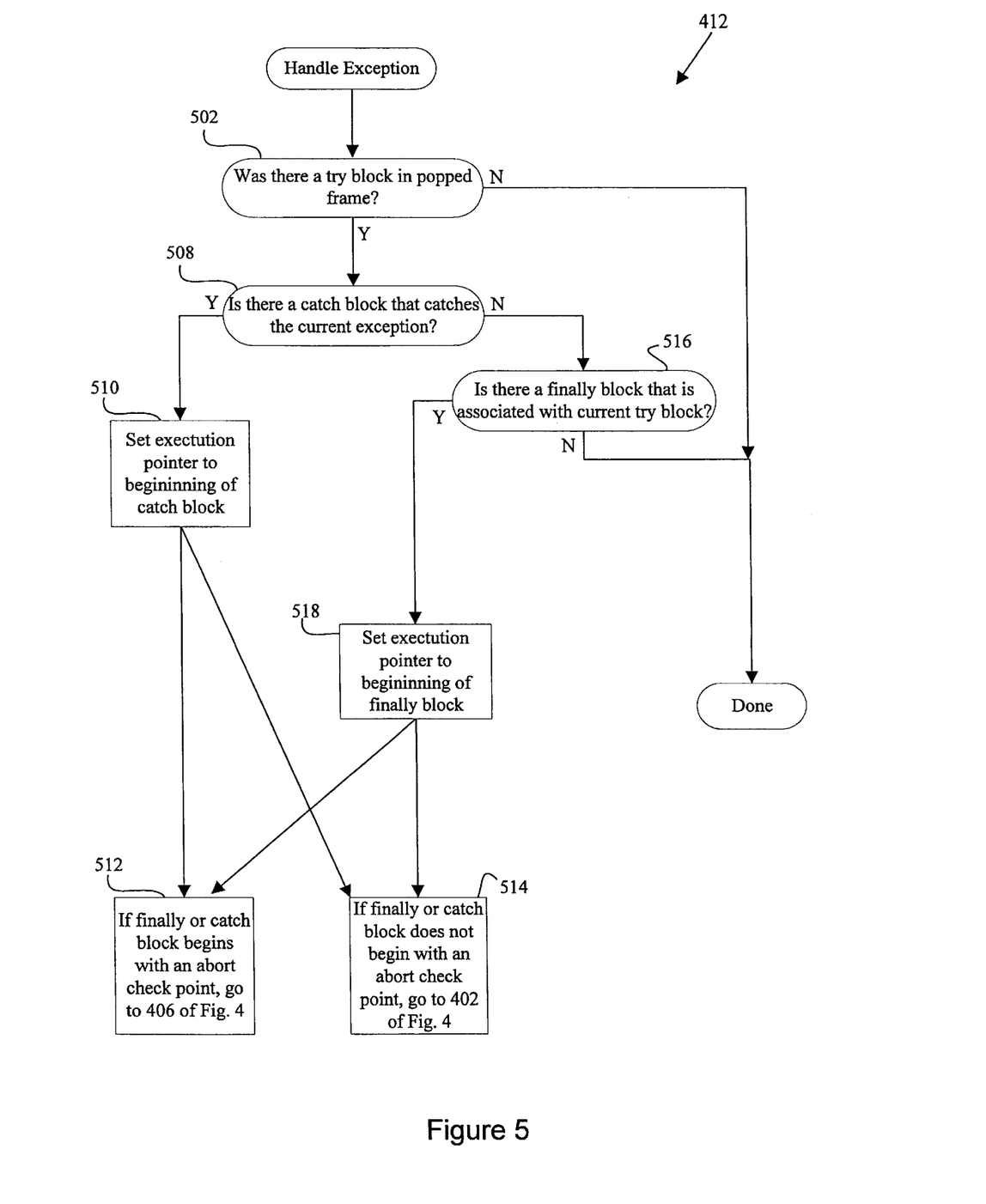
FIG. 5 is a flowchart illustrating the exception handling operation 412 of FIG. 4 in accordance with one embodiment of the present invention.

FIG. 5 is a flowchart illustrating the exception handling operation 412 of FIG. 4 in accordance with one embodiment of the present invention. Within a Java™ based system, code for handling exceptions will be in the form of catch blocks or finally blocks that follow a try block. The try block includes code sets or methods that may be halted when an exception is thrown; the catch block includes code that is executed for specific exceptions that were thrown during execution of code from the preceding associated try block; and a finally block includes code that is executed if there was no catch block for the specific exception that is thrown for the associated try block.

Thus, the first thing that happens during exception handling is that it is determined whether there is a try block associated with the popped frame in operation 502. In other words, the code that was executing prior to throwing the exception is associated with a try block is followed by a catch and/or finally blocks for handling the thrown exception. If there is no try block, exception handling is not needed and the exception handling operation 412 ends. The process then proceeds to throw another exception to pop the next stack frame in operation 414 of FIG. 4.

If there is a try block, it is then determined whether there is a catch block that catches the current exception in operation 508. If there is a catch block that catches the current exception, the execution pointer is set to the beginning of the catch block in operation 510. If the catch block begins with an abort checkpoint, in operation 512 the process goes back to operation 406 of FIG. 4. If the code is untrusted, there will be an abort checkpoint. A resource context is then identified for the catch block in operation 406 of FIG. 4, and an exception is thrown in operation 408 if the abort flag within the identified resource context is set.

Referring back to FIG. 5, if the catch block does not begin with an abort checkpoint, the code of the catch block is then executed in operation 402 of FIG. 4. The catch block typically contains clean up code. Execution of catch block code typically occurs when the currently executing code is trusted since no abort checkpoints are inserted within trusted code. Execution continues until another checkpoint triggers throwing an exception in operation 410 of FIG. 4 if the abort flag of the resource context associated with the checkpoint code is set.

As shown in FIG. 5, if there is not a catch block that catches the current exception, it is then determined whether there is a "finally block" that is associated with the current try block in operation 516. If there is a finally block, the execution pointer is set to the beginning of the finally block in operation 518. As in the catch block, if the finally block begins with an abort checkpoint, in operation 512 the process goes to operation 406 of FIG. 4, where the resource context is identified for the finally block. An exception is then thrown in operation 410 if the associated abort flag is set.

If the finally block does not begin with an abort checkpoint, in operation 514 the process goes back to operation 402 of FIG. 4, where code continues to execute. When untrusted code is reached, an abort checkpoint will be found in operation 404 and an exception will then be thrown in operation 410 if the associated abort flag is set. If there is not a finally block associated with the current try block in operation 516 of FIG. 5, exception handling 412 ends and a next stack frame is popped in operation 414 of FIG. 4.

Figure 6:
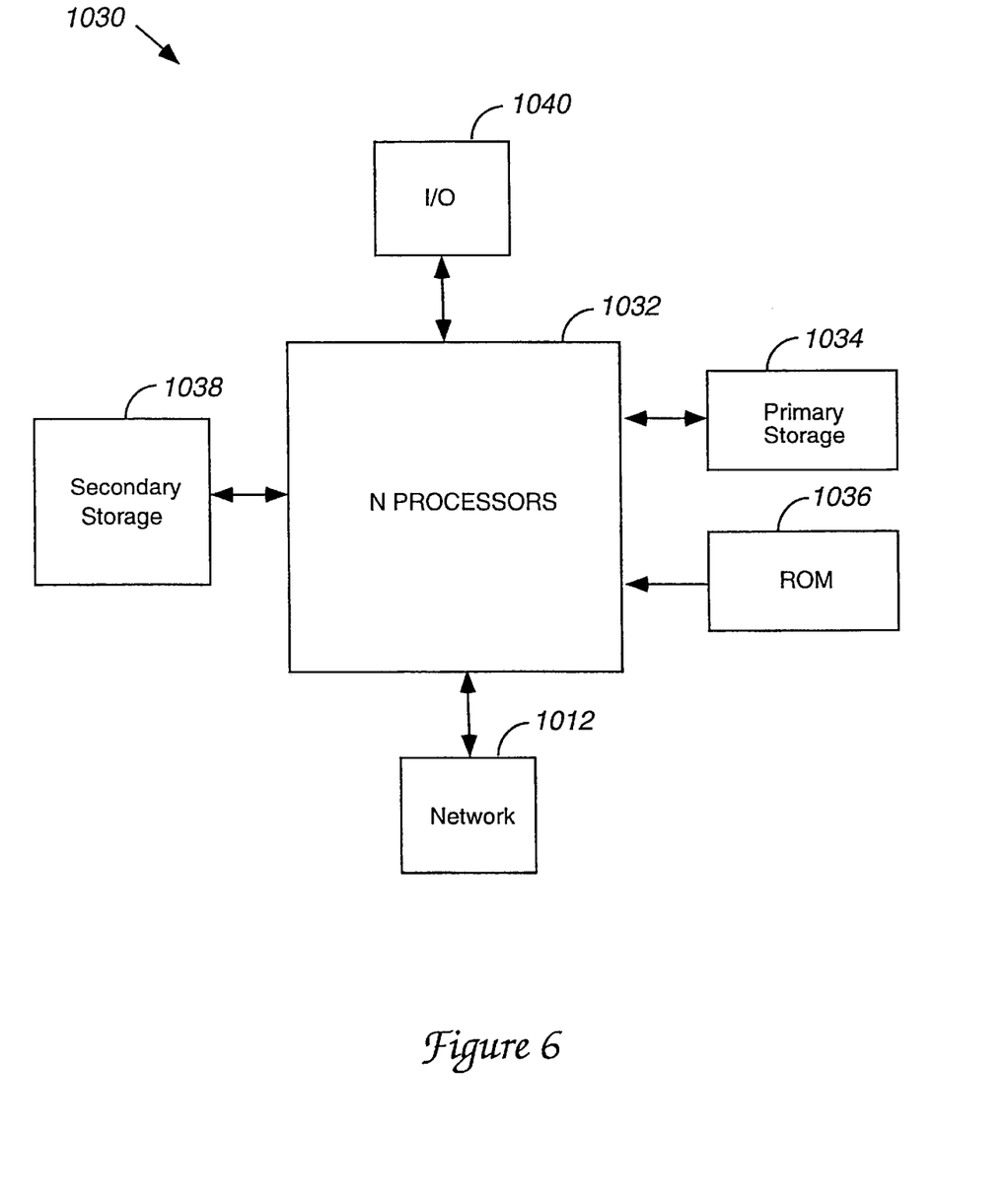
FIG. 6 is a diagrammatic representation of a general-purpose computer system suitable for implementing the present invention.

FIG. 6. illustrates a typical, general-purpose computer system suitable for implementing the present invention. The computer system 1030 includes any number of processors 1032 (also referred to as central processing units, or CPUs) that are coupled to memory devices including primary storage devices 1034 (typically a read only memory, or ROM) and primary storage devices 1036 (typically a random access memory, or RAM). The computer system may take any suitable form. For example, the computer system may be integrated with a navigational system or television set top box.

Computer system 1030 or, more specifically, CPUs 1032, may be arranged to support a virtual machine, as will be appreciated by those skilled in the art. One example of a virtual machine that is supported on computer system 1030 will be described below with reference to FIG. 7. As is well known in the art, ROM acts to transfer data and instructions uni-directionally to the CPUs 1032, while RAM is used typically to transfer data and instructions in a bidirectional manner. CPUs 1032 may generally include any number of processors. Both primary storage devices 1034, 1036 may include any suitable computer-readable media. A secondary storage medium 1038, which is typically a mass memory device, is also coupled bi-directionally to CPUs 1032 and provides additional data storage capacity. The mass memory device 1038 is a computer-readable medium that may be used to store programs including computer code, data, and the like. Typically, mass memory device 1038 is a storage medium such as a hard disk or a tape which generally slower than primary storage devices 1034, 1036. Mass memory storage device 938 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPUs 1032.

CPUs 1032 are also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 1032 optionally may be coupled to a computer or telecommunications network, e.g., an Internet network or an intranet network, using a network connection as shown generally at 1012. With such a network connection, it is contemplated that the CPUs 1032 might receive information from the network, or might output information to the network in the course of performing the above-described mechanisms for aborting threads. Such information, which is often represented as a sequence of instructions to be executed using CPUs 1032, may be received from and outputted to the network, for example, in the form of a computer data signal embodied in a carrier wave. The above-described devices and materials will be familiar to those of skill in the computer hardware and software arts.

Figure 7:
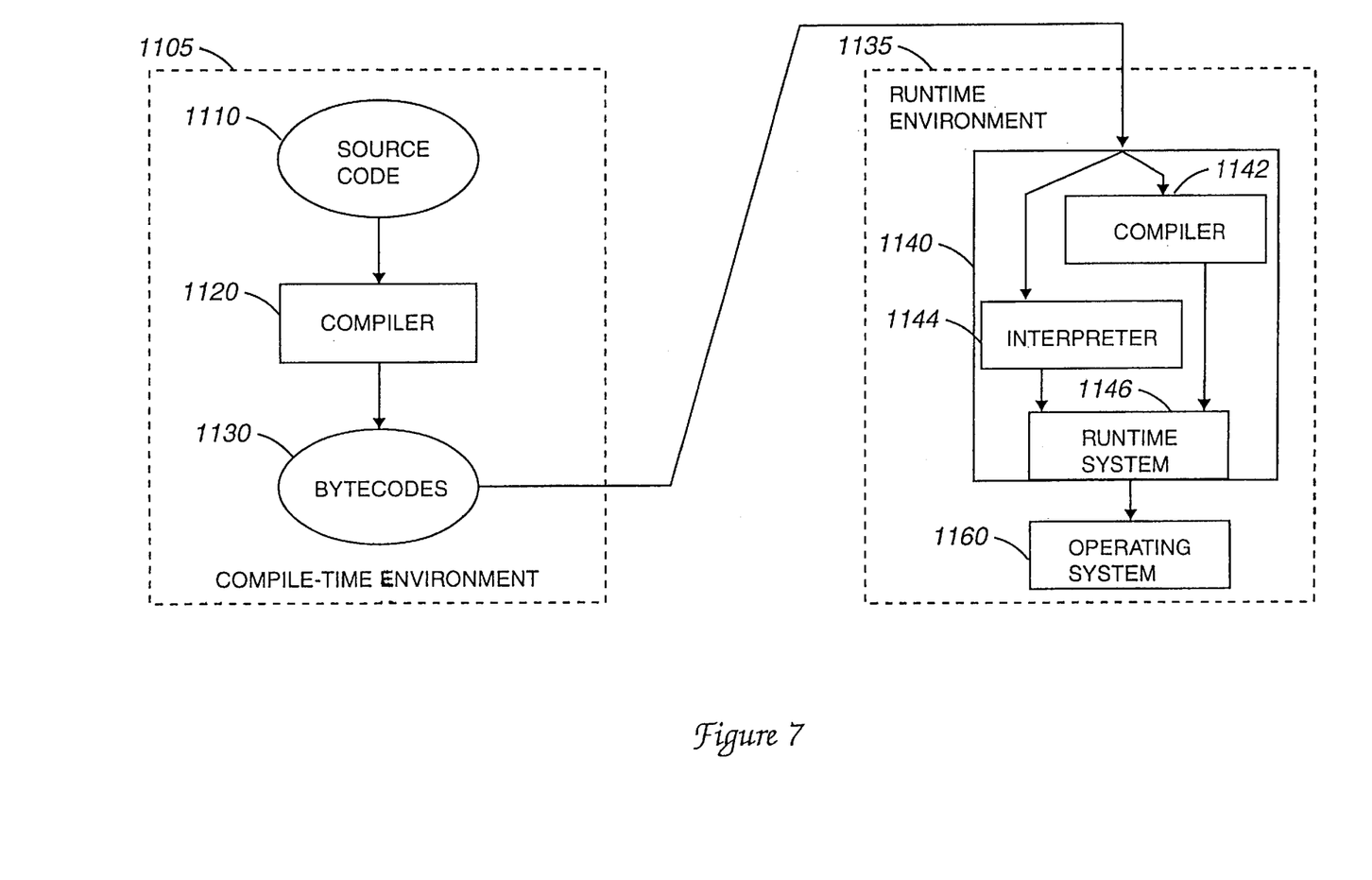
FIG. 7 is a diagrammatic representation of a virtual machine suitable for implementing the present invention.

As previously mentioned, a virtual machine may execute on computer system 1030. FIG. 7 is a diagrammatic representation of a virtual machine which is supported by computer system 1030 of FIG. 6, and is suitable for implementing the present invention. When a computer program, e.g., a computer program written in the Java (tm) programming language, is executed, source code 1110 is provided to a compiler 1120 within compile-time environment 1105. Compiler 1120 translates source code 1110 into byte codes 1130. In general, source code 1110 is translated into byte codes 1130 at the time source code 1110 is created by a software developer.

Byte codes 1130 may generally be reproduced, downloaded, or otherwise distributed through a network, e.g., network 1012 of FIG. 6, or stored on a storage device such as primary storage 1034 of FIG. 6. In the described embodiment, byte codes 1130 are platform independent. That is, byte codes 1130 may be executed on substantially any computer system that is running on a suitable virtual machine 1140.

Byte codes 1130 are provided to a runtime environment 1135 which includes virtual machine 1140. Runtime environment 1135 may generally be executed using a processor or processors such as CPUs 1032 of FIG. 6. Virtual machine 1140 includes a compiler 1142, an interpreter 1144, and a runtime system 1146. Byte codes 1130 may be provided either to compiler 1142 or interpreter 1144.

When byte codes 1130 are provided to compiler 1142, methods contained in byte codes 1130 are compiled into machine instructions. In one embodiment, compiler 1142 is a just-in-time compile which delays the compilation of methods contained in byte codes 1130 until the methods are about to be executed. When byte codes 1130 are provided to interpreter 1144, byte codes 1130 are read into interpreter 1144 one byte code at a time. Interpreter 1144 then performs the operation defined by each byte code as each byte code is read into interpreter 1144. That is, interpreter 1144 "interprets" byte codes 1130, as will be appreciated by those skilled in the art. In general, interpreter 1144 processes byte codes 1130 and performs operations associated with byte codes 1130 substantially continuously.

When a method is invoked by another method, or is invoked from runtime environment 1135, if the method is interpreted, runtime system 1146 may obtain the method from runtime environment 1135 in the form of a sequence of byte codes 1130, which may be directly executed by interpreter 1144. If, on the other hand, the method which is invoked is a compiled method which has not been compiled, runtime system 1146 also obtains the method from runtime environment 1135 in the form of a sequence of byte codes 1130, then may go on to activate compiler 1142. Compiler 1142 then generates machine instructions from byte codes 1130, and the resulting machine-language instructions may be executed directly by CPUs 1032. In general, the machine-language instructions are discarded when virtual machine 1140 terminates. The operation of virtual machines or, more particularly, Java™ virtual machines, is described in more detail in *The Java™ Virtual Machine Specification* by Tim Lindholm and Frank Yellin (ISBN 0-201-63452-X) which is incorporated herein by reference.

Although only a few embodiments of the present invention have been described, it should be understood that the present invention may be embodied in many other specific forms without departing from the spirit or the scope of the present invention. By way of example, the operations involved with aborting associated threads may be reordered. Steps may also be removed or added without departing from the spirit or the scope of the present invention.

Although the techniques for killing threads in accordance with the present invention are particularly suitable for implementation with respect to a Java™ based environment, the techniques may generally be applied in any suitable object-based environment. In particular, the techniques are suitable for use in platform-independent object-based environments. It should be appreciated that the methods may also be implemented in some distributed object-oriented systems.

Accordingly, the present embodiments are to be considered as illustrative and not restrictive, and the invention is not to be limited to the details given herein, but may be modified within the scope and equivalents of the appended claims.

What is claimed is:

1. A method for aborting a thread that has an associated thread stack with a plurality of frames that are associated with either trusted or untrusted code, the method comprising:
    (a) selecting a frame within the thread stack of the thread to be aborted;
    (b) popping the selected frame from the thread stack of the thread to be aborted when the selected frame is associated with untrusted code; and
    (c) processing an exception for the selected frame from the thread stack of the thread to be aborted when the selected frame is associated with trusted code.

2. A method as recited in claim 1, wherein the selected frame is a top frame from the plurality of frames.

3. A method as recited in claim 1, further comprising repeating (a) through (c) for each frame within the thread stack such that the associated thread is aborted.

4. A method as recited in claim 1, wherein the untrusted code and trusted code of the frames are in the form of methods.

5. A method as recited in claim 1, wherein the trusted code is unlikely to result in a denial of service attack and it is unknown whether untrusted code will mount a denial of service attack.

6. A method as recited in claim 1, wherein the untrusted code has an unknown resource utilization amount.

7. A method as recited in claim 1, wherein the untrusted code was downloaded from an untrusted source.

8. A method as recited in claim 1, wherein processing an exception for the selected frame allows the selected frame to complete any clean up routines.

9. A method as recited in claim 8, wherein the selected frame is popped after any clean up routines are completed.

10. A method as recited in claim 1, wherein the popping of the selected frame is performed by a virtual machine.

11. A method as recited in claim 1, further comprising popping the selected frame when it is associated with any currently misbehaving code.

12. A computer program product for aborting a thread that has an associated thread stack with a plurality of frames that are associated with either trusted or untrusted code, the computer program product comprising:
    at least one computer readable medium;
    computer program instructions stored within the at least one computer readable medium configured for causing a processing device to perform the following operations:

(a) selecting a frame within the thread stack of the thread to be aborted;
(b) popping the selected frame from the thread stack of the thread to be aborted when the selected frame is associated with untrusted code; and
(c) processing an exception for the selected frame from the thread stack of the thread to be aborted when the selected frame is associated with trusted code.

13. A computer program produced as recited in claim 12 wherein the computer program instructions stored within the at least one computer readable medium are further configured for causing the processing device to perform the following operations for repeating (a) through (c) for each frame within the thread stack such that the associated thread is aborted.

14. A computer system for aborting a thread that has an associated thread stack with a plurality of frames that are associated with either trusted or untrusted code, the computer system comprising:
   an identifier configured to select a frame within the thread stack of the thread to be aborted; and
   a frame handler configured to pop the selected frame from the thread stack of the thread to be aborted when the selected frame is associated with untrusted code and to process an exception for the selected frame from the thread stack of the thread to be aborted when the selected frame is associated with trusted code.

15. A computer system as recited in claim 14 wherein the identifier selects each frame within the thread stack and the frame handler pops or processes an exception for each frame within the thread stack such that the associated thread is aborted.

* * * * *